(12) United States Patent
Öberg et al.

(10) Patent No.: US 11,124,172 B2
(45) Date of Patent: Sep. 21, 2021

(54) METHOD AND A DEVICE FOR CONTROLLING GEAR SHIFTING IN A VEHICLE WITH A TRANSMISSION

(71) Applicant: VOLVO TRUCK CORPORATION, Gothenburg (SE)

(72) Inventors: Niklas Öberg, Torslanda (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/493,858

(22) PCT Filed: Mar. 27, 2017

(86) PCT No.: PCT/EP2017/057164
§ 371 (c)(1),
(2) Date: Sep. 13, 2019

(87) PCT Pub. No.: WO2018/177496
PCT Pub. Date: Oct. 4, 2018

(65) Prior Publication Data
US 2020/0079344 A1 Mar. 12, 2020

(51) Int. Cl.
*B60W 30/19* (2012.01)
*B60W 10/06* (2006.01)
(Continued)

(52) U.S. Cl.
CPC ............ *B60W 10/06* (2013.01); *B60W 10/11* (2013.01); *B60W 30/19* (2013.01);
(Continued)

(58) Field of Classification Search
CPC ...... B60W 10/06; B60W 10/11; B60W 30/19; B60W 2710/0666; F16H 61/0437;
(Continued)

(56) References Cited

U.S. PATENT DOCUMENTS 5,323,667 A 6/1994 Tweed et al.
9,212,741 B1 12/2015 Ho et al.
(Continued)

FOREIGN PATENT DOCUMENTS

CN 102483153 A 5/2012
CN 105083001 A 11/2015
(Continued)

OTHER PUBLICATIONS

China Office Action dated Jun. 11, 2020, in corresponding China Application No. 201780089023.6, 12 pages.
(Continued)

*Primary Examiner* — Justin Holmes
(74) *Attorney, Agent, or Firm* — Venable LLP; Jeffri A. Kaminski

(57) ABSTRACT

The invention relates to a method and an arrangement for controlling a gearshift in a vehicle with a transmission (120) comprising a stepped gearing, the transmission (120) being arranged between an engine (110) and at least one driven axle (123), wherein the engine and the transmission are controlled by an electronic control unit (140), The method involves monitoring at least one parameter related to a vehicle operating condition; registering that a manual upshift command is requested; determining a desired shift point and a target engine speed based on a parameter comprising at least current engine speed; and performing an upshift when the target engine speed is reached.

20 Claims, 5 Drawing Sheets

(51) Int. Cl.
    *B60W 10/11*     (2012.01)
    *F16H 61/04*     (2006.01)
    *F16H 63/50*     (2006.01)
    *F16H 59/14*     (2006.01)
    *F16H 59/36*     (2006.01)

(52) U.S. Cl.
    CPC . *B60W 2710/0666* (2013.01); *F16H 61/0437* (2013.01); *F16H 63/502* (2013.01); *F16H 2059/148* (2013.01); *F16H 2059/366* (2013.01); *F16H 2302/06* (2013.01)

(58) Field of Classification Search
    CPC ............. F16H 63/502; F16H 2059/148; F16H 2059/366; F16H 2302/06; F16H 59/66; F16H 61/08; F16H 61/682
    See application file for complete search history.

(56) References Cited

U.S. PATENT DOCUMENTS

| | | | |
|---|---|---|---|
| 2006/0224291 A1* | 10/2006 | Geist | B60W 10/11 |
| | | | 701/51 |
| 2007/0026997 A1 | 2/2007 | Tohta et al. | |
| 2007/0099752 A1 | 5/2007 | Saito et al. | |
| 2007/0179694 A1 | 8/2007 | McMullen | |
| 2009/0018732 A1 | 1/2009 | Choby et al. | |
| 2009/0118096 A1 | 5/2009 | Boutell | |
| 2010/0256883 A1 | 10/2010 | Sauter | |
| 2012/0166051 A1 | 6/2012 | Swartling et al. | |
| 2013/0035829 A1 | 2/2013 | Tiberg | |
| 2015/0330503 A1 | 11/2015 | Sujan et al. | |
| 2017/0210374 A1* | 7/2017 | Geller | B60W 30/19 |

FOREIGN PATENT DOCUMENTS

| | | |
|---|---|---|
| DE | 102004061079 A1 | 6/2006 |
| DE | 102007045339 A1 | 4/2009 |
| DE | 102011079392 A1 | 1/2013 |
| EP | 1215071 A1 | 6/2002 |

OTHER PUBLICATIONS

International Search Report and Written Opinion dated Nov. 29, 2017 in International Application No. PCT/EP2017/057164.

* cited by examiner

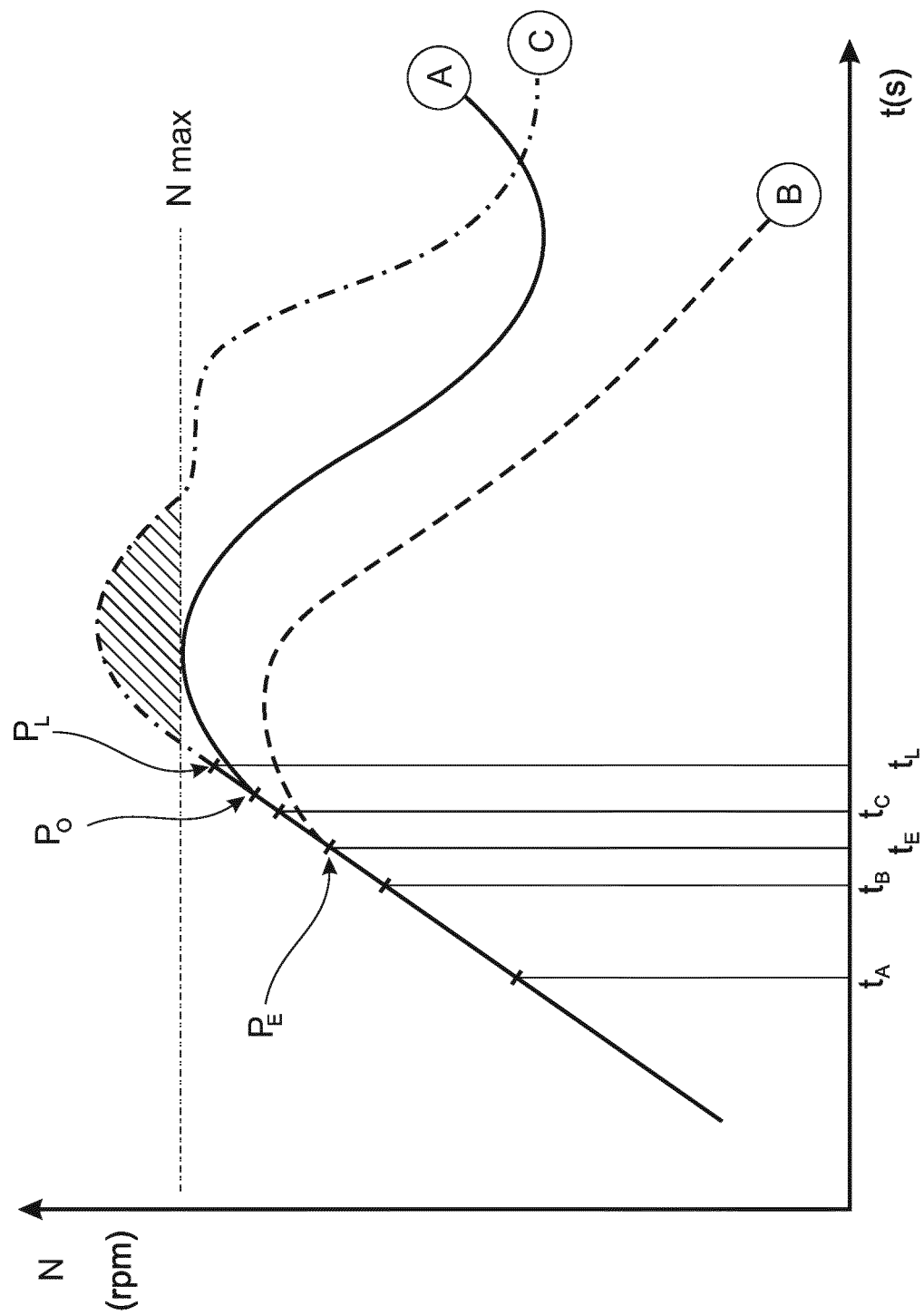

METHOD AND A DEVICE FOR CONTROLLING GEAR SHIFTING IN A VEHICLE WITH A TRANSMISSION

TECHNICAL FIELD

The invention relates to a method and a system for controlling gear shifting in a vehicle equipped with a transmission when the vehicle is travelling uphill.

The invention can be applied in heavy-duty vehicles, such as trucks, articulated trucks, buses and construction equipment, which vehicles may be manned or unmanned. Although the invention will be described with respect to a heavy-duty vehicle, the invention is not restricted to this particular vehicle, but may also be used in other vehicles such as articulated haulers, wheel loaders, and other working machines.

BACKGROUND

During a gear change in a vehicle, the vehicle driveline does not transmit torque during the shifting. Consequently, the engine does not provide propulsion to the driven wheels during the time when the shifting is performed. During the upshift process the vehicle continues to roll in the travelling direction propelled by its moment of inertia.

Gear transmission in such vehicles often consists of a gear transmission of manually controlled gearboxes with stepped gearing, controlled by a control system, also termed automated manual transmission (AMT). As a rule, AMT gearboxes are lighter and cheaper to manufacture than a dual clutch gearbox. They also have a higher efficiency compared to traditional automatic transmissions. AMT gearboxes are particularly suited for heavy goods vehicles, which are largely used for long distance haulage. This type of AMT gearboxes often comprises three parts: a split gear, a main gearbox and a range gear, managed by a common control system. When shifting, the main gearbox is in neutral, wherein the split and/or range gear is shifted from high to low or vice versa. Subsequently, the new gear may be engaged in the main gearbox. This means that the shifting process is time-consuming and the speed of the vehicle therefore decreases during the shifting process.

The shifting process can be speeded up using a technique where an expected subsequent gear is pre-engaged while a current gear is still engaged. This allows the shifting time to be shortened, as well as the time which the vehicle spends in a zero torque state during the shifting process. However, unless an upshift is timed exactly by the driver, a disruption to comfort in the form of jerks and shocks may occur during shifting. This is a consequence of large torques transmitted through the driveline during shifting with torque interruption and is mainly caused by rotation speed errors when a subsequent gear is engaged. If shifting is performed carefully, the shifting time is extended, which leads to an undesired speed reduction of the vehicle.

An interruption of propulsive torque during shifting can cause problems for the vehicle and its driver, especially when shifting under conditions such as steep uphill roads or uphill travel with a heavy load. Since the engine has no traction power in the driving direction during the shifting process, the vehicle can lose speed quickly because of the uphill slope and/or heavy load.

When travelling uphill the driver can request an upshift from the gearbox if it is deemed necessary to avoid reaching a maximum allowed engine speed while travelling up a hill. If the request to upshift is made too early then the engine speed can be too low for the subsequent higher gear. The result can be that the engine generates a torque that is so low that the vehicle cannot cope with the gradient of the uphill and therefore stalls. Consequently, the gearbox is required to down-shift after a failed upshift, which again leads to a zero torque state and a vehicle speed that is reduced even further. On the other hand, if the request to upshift is made too late then the engine speed can be too high for the subsequent higher gear. The result can be that the engine speed will reach the maximum allowed engine speed during the upshift, which condition can cause a fuel cut and a loss of propulsive torque. Consequently, a manual request for an upshift during uphill travel requires a skill and timing from the driver.

Hence it is desirable to provide an improved method and arrangement for controlling gear shifting in a transmission in order to overcome the above problems.

SUMMARY

An object of the invention is to provide a method and an arrangement for controlling gear shifting in a transmission, which method and arrangement is described in the appended claims.

In the subsequent text the invention is described in relation to a transmission comprising a stepped gearing. Suitable transmissions for the intended purpose are semi-automatic transmissions (SAT), automatic transmissions (AT) and automated mechanical transmissions (AMT). The transmission used has a manual gear shifting mode used when carrying out the method according to the invention.

According to a preferred embodiment, the invention relates to a method to control a gearshift in a vehicle with a transmission comprising a stepped gearing. The transmission is arranged between an engine and at least one driven axle, wherein the engine and the transmission are controlled by an electronic control unit. The method involves performing the steps of:

monitoring at least one parameter related to a vehicle operating condition;
registering that a manual upshift command is requested;
determining a desired shift point and a target engine speed based on a parameter comprising at least current engine speed; and
performing an upshift when the target engine speed is reached.

The desired shift point and target engine speed can be determined based on one or more parameters in addition to the current engine speed. The electronic control unit can for instance be arranged to register that an increased travel resistance has been detected. Further parameters can comprise one or more components of the detected travel resistance, such as uphill gradient and/or rolling resistance.

An increase in travel resistance can be caused by the vehicle encountering an uphill slope or gradient, requiring more torque from the engine to maintain or increase vehicle speed. Alternatively, or in addition, an increase in travel resistance can be caused by the vehicle encountering a stretch of soft ground causing increased rolling resistance, and/or an unexpected head wind causing increased air resistance.

Devices and sensors suitable for determining the travel resistance are known in the art. For instance, the travel resistance can be derived by comparing differences between a computed engine output and a detected engine output or by means of a detected slope, possibly in combination with the vehicle load. Engine related data is available from existing engine related sensors and slope angle can be detected by means of an inclination sensor or a similar suitable sensor. The current vehicle speed can be determined using the vehicle speedometer, one or more a wheel speed sensors or a similar sensor means.

According to one example, the travel resistance increases when the vehicle travels uphill. If the driver senses that the vehicle speed increases as the vehicle negotiates an uphill slope, then a manual request for an upshift can be made using a gear lever, a control paddle or a suitable switch or button. The shift point and target engine speed are determined by the electronic control unit, using the time required to perform an upshift from the current to the next gear and the current rate of increase of engine speed. The parameters used in this example are at least current engine speed and the detected gradient. During the gear shift it is desirable that the engine speed increases from the target engine speed to a speed near or up to, but not over the maximum allowable engine speed.

According to a further example, the travel resistance increases when the vehicle a road surface causing increased rolling resistance. If the driver senses that the vehicle speed increases as the vehicle negotiates such a road section, then a manual request for an upshift can be made as described above. The shift point and target engine speed are determined by the electronic control unit, using the time required to perform an upshift from the current to the next gear and the current rate of increase of engine speed. The parameters used in this example are at least current engine speed and the increase in output torque caused by the increase in rolling resistance. During the gear shift it is desirable that the engine speed increases from the target engine speed to a speed near or up to, but not over the maximum allowable engine speed.

The method can also involve determining the shift point and the target engine speed based on a further parameter comprising at least vehicle acceleration. In this case, when the shift point and target engine speed are determined the electronic control unit will also consider the current rate of acceleration of the vehicle. The current acceleration can be determined using an accelerometer or a similar suitable sensor.

Alternative or additional parameters can comprise a detected uphill gradient or an uphill gradient combined with a determined vehicle load. The road gradient can be detected using any suitable gradient sensor, such as an accelerometer, or from stored GPS navigation data. The vehicle load can be determined using input data from an external weight sensor, e.g. from a road-side weighing station, or from suitable on-board sensors, such as pressure sensors in one or more bellows forming part of the vehicle suspension. A further parameter can be the requested torque. In the latter case, the shift point and the target engine speed can be determined if the requested torque corresponds to at least 80% of wide open throttle (WOT). The requested torque can be determined using a suitable sensor located on or near the accelerator pedal or from engine related data relating to a current amount of injected fuel or demanded torque. The requested torque or the amount of injected fuel in combination with the current engine speed is a measure of the currently available engine torque.

According to the invention, the above-mentioned parameters used for determining a desired shift point and a target engine speed can be used alone or in combination.

Preferably, the method involves selecting the shift point and the target engine speed so that an engine speed exceeding the maximum engine speed is avoided during the upshift. By preventing the engine speed from exceeding the maximum allowable engine speed it is possible to avoid a loss of propulsive torque caused by a fuel cut-out triggered by an excessive engine speed. In particular, the shift point can be selected so that the time required by the gearbox for performing an upshift is less than the time taken for the engine speed to increase from the target speed to the maximum engine speed during the upshift. The increase in engine speed occurs when the clutch is disengaged, causing a torque interruption in the transmission.

When the electronic control unit registers that a manual upshift command is requested by the driver it will determine a desired shift point and a target engine speed based on an instantaneous parameter comprising at least current engine speed. Initiation of a gear shift can be delayed until the engine speed for the determined shift point is reached. During a delay, the electronic control unit continuously monitors the parameters used. This allows the shift point and target engine speed to be modified at any time up to the determined shift point, for instance if a change in gradient is detected prior to the upshift. The monitoring continues until the upshift is performed or aborted. In this way, the driver can request an upshift and leave the timing of the upshift to the electronic control unit. This allows the driver to concentrate on driving the vehicle, instead of having to concentrate on the exact timing when a manual request for an upshift must be issued to avoid problems relating to an early or a late upshift.

According to one example, the shift point and target engine speed can be calculated using the ECU, based on the one or more continuously monitored parameters. Alternatively, the shift point and target engine speed can be determined using at least one look-up table stored in the ECU. The tabulated values can be based on the at least one monitored parameter. The look-up tables can be generated using experimental values, previously recorded historical values or by means of self-learning algorithms.

The invention further relates to an arrangement to control a gearshift in a vehicle with a transmission comprising a stepped gearing. The transmission is arranged between an engine and at least one driven axle, wherein the engine and the transmission are controlled by an electronic control unit. In operation, the electronic control unit is arranged to monitor at least one parameter related to a vehicle operating condition. The electronic control unit is arranged to register that a manual upshift command is requested by the driver. Upon registering a request for an upshift, the electronic control unit is arranged to determine a desired shift point and a target engine speed based on a parameter comprising at least current engine speed. Finally, the electronic control unit is arranged to generate instructions to the transmission to perform an upshift when the target engine speed is reached.

The desired shift point and target engine speed can be determined based on one or more parameters in addition to the current engine speed. The electronic control unit can for instance be arranged to register that an increased travel resistance has been detected. Further parameters can comprise one or more components of the detected travel resistance, such as uphill gradient and/or rolling resistance. The increase in travel resistance can be caused by the vehicle travelling on an uphill slope, by the vehicle encountering a stretch of soft ground causing increased rolling resistance, and/or by an unexpected head wind causing increased air resistance.

The invention further relates to a vehicle, such as a commercial vehicle, comprising a control unit according to the invention. In this context, the term commercial vehicle is considered to include heavy-duty vehicles, such as trucks, articulated trucks, buses and construction equipment, as well as other vehicles such as articulated haulers, wheel loaders, and related working machines.

The invention further relates to a control unit for controlling a gearshift in a vehicle with a transmission, the control unit being configured to perform the steps of the method according to the invention.

The invention further relates to a computer program comprising program code means for performing the steps of the method according to the invention for controlling a gearshift in a vehicle with a transmission when said program is run on a computer.

The invention further relates to a computer readable medium carrying a computer program comprising program code means for performing the steps of the method according to the invention for controlling a gearshift in a vehicle with a transmission when said program product is run on a computer.

The invention further relates to a control unit for controlling a gearshift in a vehicle with a transmission, the control unit being configured to perform the steps of the method according to the invention.

When driving a vehicle under severe applications, e.g. steep uphills and/or bad roads, AMT transmissions are as a rule driven in manual mode. The reason is that road conditions are changing rapidly and rolling resistance, maximum traction and other required parameters are not known with any precision to the control system.

A particular problem with executing an upshift manually is that the timing is very important. If the shift is triggered too early the engine speed will be low when the shift is executed resulting in a too low engine speed after an upshift which might cause a downshift, or even worse, a vehicle stop. If the gearshift is triggered too late the engine will "hit" the high idle governor determining the maximum allowable engine speed, causing a fuel cut-out. This will cause a reduction of the vehicle acceleration, resulting in a bad shift and also possibly in a vehicle stop.

By the provision of a method and an arrangement which involve control of a gear shifting process in a transmission, an advantage is that risk of a failed upshift is significantly reduced. The invention allows the driver to perform a manual request for an upshift, for instance, during uphill travel in good time before the upshift is required, as the inventive method will monitor a number of parameters and perform the upshift at an optimal point in time. Instead of a relatively narrow window during which the driver must request an upshift in order to avoid shocks or jerks during shifting, the driver can request an upshift well in advance of the start of this window and leave the exact shift timing to the control unit.

The invention allows the engine speed to be maximized at upshifts, thereby ensuring the execution of successful upshifts and avoiding unwanted vehicle stop in critical situations. In this way the number of manual actions required by the driver can be reduced, allowing the driver to concentrate on the road and improving the comfort for the driver.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings:

FIG. 2A shows a schematic diagram illustrating a number of alternative gear shifting scenario for an upshift performed when travelling uphill;

DETAILED DESCRIPTION OF EXAMPLE EMBODIMENTS OF THE INVENTION

Figure 1:
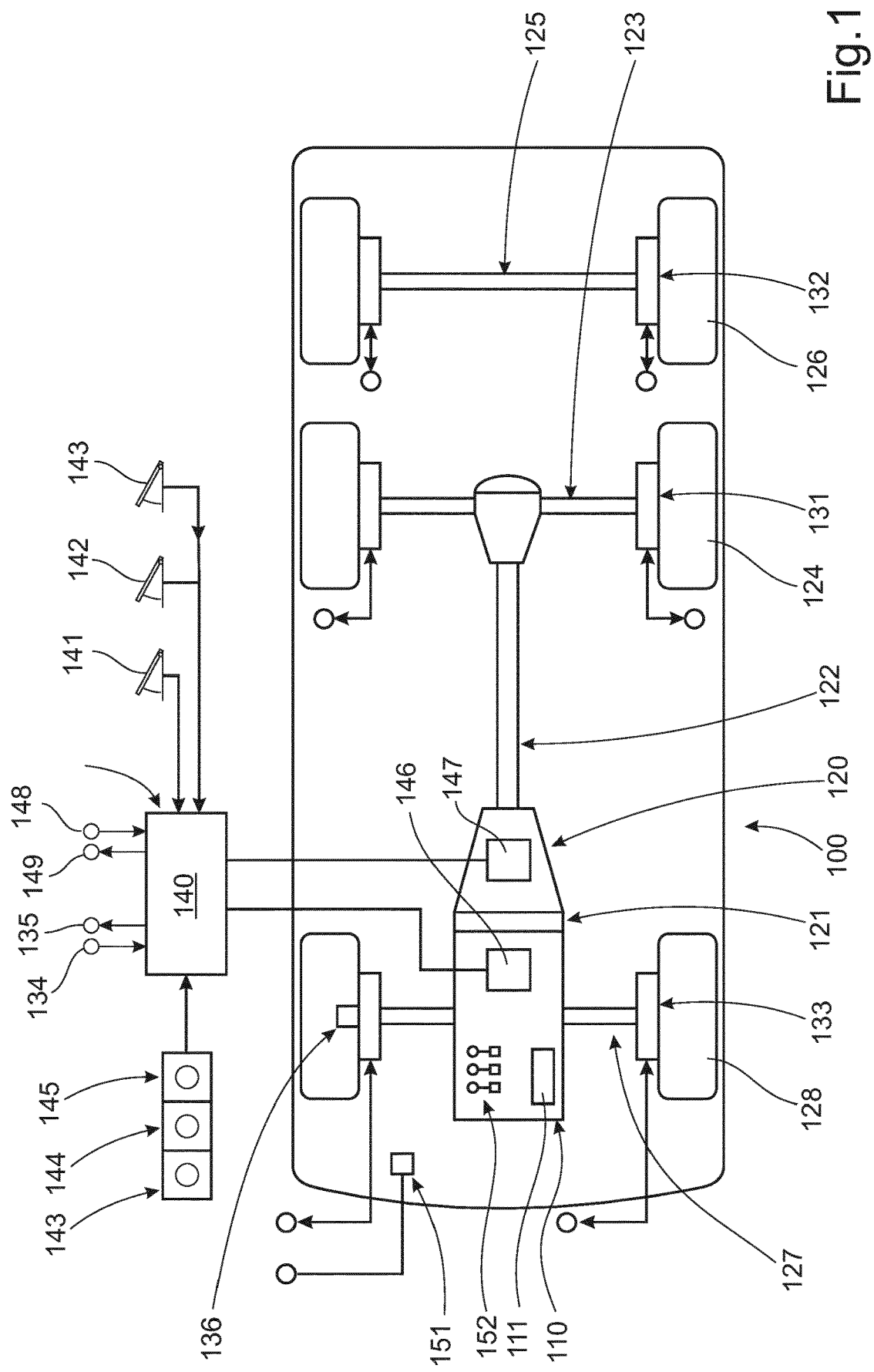
FIG. 1 shows a schematic vehicle provided with a gear shifting arrangement according to one embodiment of the invention.

FIG. 1 shows a schematic vehicle provided with a gear shifting arrangement according to one embodiment of the invention. FIG. 1 shows a vehicle 100, such as a tractor of a tractor semi-trailer vehicle, having an electronically controlled internal combustion engine 110 coupled to an automated mechanical transmission 120 via a clutch mechanism 121. It should be noted that a vehicle as shown in FIG. 1 only represents one of the possible applications for the system and method of the present invention. The present invention can be implemented in any type of commercial or industrial vehicle comprising a vehicle speed control system with a suitable transmission as described herein.

The transmission 120 in this example is an automated mechanical transmission (AMT) comprising a stepped gearing connected to an output shaft 122 coupled to a driven axle 123 driving a pair of driven wheels 124. The vehicle 100 includes at least two axles such as a steerable axle 127 and at least one rear driven axle 123. FIG. 1 shows a rear driven axle 123 and a trailing axle 125 with associated wheels 124, 126, as well as a steerable axle 127 with associated wheels 128. Each axle 123, 125, 127 supports corresponding wheels 124, 126, 128 having service brake components 131, 132, 133 which can be manually or automatically actuated depending upon the particular application and operating conditions. For example, a vehicle equipped with an antilock braking system (ABS) can assume automatic control of braking under appropriate conditions such as when the vehicle is braking and the system detects a sufficient slip differential among one or more wheels, or when the vehicle travels downhill under the control of a cruise control system. The service brake components 131, 132, 133 include wheel speed sensors and electronically controlled pressure valves (not shown) to effect control of the vehicle braking system. The service brake components 131, 132, 133 are connected to a central electronic control unit (ECU) 140 by means of suitable wiring, as schematically indicated by the input 134 and output 135 in the figure. A wheel speed sensor 136 is schematically indicated in FIG. 1. The output signal from one or more such sensors can be used for calculating the vehicle speed.

The vehicle 100 includes conventional operator controls such as an accelerator pedal 141, a brake pedal 142 and a clutch pedal 143, as well as an operator interface, such as dashboard control console (not shown). In an AMT, gear shifts can be achieved without the driver manually engaging and/or disengaging a master clutch by means of the mechanical manual clutch pedal 143, which pedal is normally only used for starting the vehicle from rest, reversing or during low speed manoeuvring. The dashboard control console can include any one of a number of output devices, such as lights, displays, buzzers, gages, and the like, and various input devices, such as switches, push buttons, potentiometers, or the like. Examples of input devices are the schematically indicated shift controllers 144, 145 for manually requesting a gear shift, such as an upshift controller 144, and a downshift controller 145. The up-/downshift controllers 144, 145 are connected to the ECU 140, which is arranged to issue shift commands to the transmission 120.

The vehicle control system includes the central ECU 140 which is connected to electronic control modules 146, 147 for the engine 110 and the transmission 120, respectively. The ECU 140 also communicates with a variety of sensors via inputs 148 and with numerous actuators via outputs 149. Sensors (not shown) may include a steering angle sensor, wheel speed sensors (included in service brake components 131, 132, 133), an electronic accelerator pedal angle sensor, a brake pedal sensor or switch, a clutch control/sensor, a transmission output shaft speed sensor, a sensor/accelerometer 151 for indicating vehicle inclination, at least longitudinal inclination, and sensors for various engine parameters 152, such as current fuel injection rate.

During uphill travel the arrangement for controlling gear shifting in the ECU 140 monitors information from available sensors and evaluates their input to determine parameters such as current engine speed and torque output, accelerator pedal position, road speed, requested torque, road gradient, vehicle weight, using pressure sensors in one or more suspension bellows, among many others.

Actuators can include shift actuators (not shown) for automatically effecting a gear shift within the automated mechanical transmission 120. A shift actuator is used for controlling gear shifts and can be controlled to pre-engage an expected subsequent gear while a current gear is still engaged. When the driver requests an upshift using the upshift controller 144, the ECU 140 monitors information from the relevant sensors and determines a desired shift point and a target engine speed. When the target engine speed is attained, the ECU 140 outputs a command to the transmission control module 147, which will execute the upshift.

Actuators can further include electronically controlled pressure valves (included in service brake components 131, 132, 133), and one or more auxiliary brakes, such as an engine retarder 111. An engine retarder is a device utilized to supplement the service brakes 131, 132, 133 when descending long grades and to prolong service brake life in high-frequency start and stop operation. Retarders may be categorized as engine brakes, exhaust brakes, hydraulic retarders and electric retarders. One example of an engine retarder is an engine brake such as the well-known "Jake brake", which converts a power producing diesel engine into a power absorbing air compressor. This is achieved by shutting off the fuel and hydraulically opening the exhaust valve as the piston approaches top dead center during the compression stroke.

The ECU 140 contains logic rules, or algorithms implemented in a variety of combinations of hardware circuitry components and programmed microprocessors to effect control of various vehicle systems and subsystems. Gear shifting functions can be incorporated as a gear shift control block within the ECU 140 which block represents the logic rules necessary to implement gear shift control functions. Alternatively, or in addition, the shift point and target engine speed can be determined using at least one look-up table stored in the ECU 140. The operation of the system will be described in further detail below.

FIG. 2A shows a schematic diagram illustrating various gear shifting scenarios for an upshift performed while travelling uphill. In the diagram, each gear shifting scenario is plotted showing engine speed N over time t. When travelling uphill the driver can manually request an upshift from the gearbox if it is deemed necessary to avoid reaching a maximum allowed engine speed while travelling up a hill. Curve A illustrates an upshift preformed according to the inventive method. In this case a control unit for controlling the upshifting process receives a manual request for an upshift from the driver at time $t_A$. In response to the request the control unit will determine a desired shift point and a target engine speed based on a parameter comprising at least the current engine speed. The invention allows the driver plenty of time to request an upshift, as the control unit can delay the actual shift until conditions are optimum. When the target engine speed is reached at the point $P_O$ the control unit will transmit a command to a transmission control module to perform an upshift. The shift point is selected so that the time required by the gearbox for performing an upshift is less than the time taken for the engine speed to increase from the target speed towards the maximum engine speed during the upshift. In this way the engine speed can increase up to but not above the maximum allowable engine speed. The increase in engine speed occurs when the clutch is disengaged, causing a torque interruption in the transmission. This will result in the highest possible engine speed after the gearshift which means that the chance of succeeding with the gearshift will be maximized.

An alternative scenario is indicated by curve B. In this case the request to upshift is made at the time $t_B$. In a prior art transmission there is a delay between the request and the upshift. The delay corresponds to the time required by the gearbox for performing an upshift. In this case the delay causes the upshift to be performed at the time $t_E$ at point $P_E$. If the request is made too early then the engine speed can be too low for the subsequent higher gear. The result of an upshift at point $P_E$ can be that the engine generates a torque that is so low that the vehicle cannot cope with the gradient of the uphill and therefore stalls. Consequently, the gearbox is required to down-shift after a failed upshift, which again leads to a zero torque state and a vehicle speed that is reduced even further.

A further alternative scenario is indicated by curve C. In this case the request to upshift is made at the time $t_C$. In this case the delay causes the upshift to be performed at the time $t_L$ at point $P_L$. If the request is made too late then the engine speed can be too high for the subsequent higher gear. The result of an upshift at point $P_L$ can be that the engine speed will reach the maximum allowed engine speed during the upshift, which condition can cause a fuel cut and a loss of propulsive torque.

In the example illustrated by curve A the driver only needs to indicate that an upshift is requested, where after the control unit delays the upshift until the conditions are optimal. This differs from the examples illustrated by curves B and C, where the driver must decide on the right timing for making a request for upshift while at the same time taking into account the inherent delay in the transmission before the upshift is actually performed.

Figure 2B:
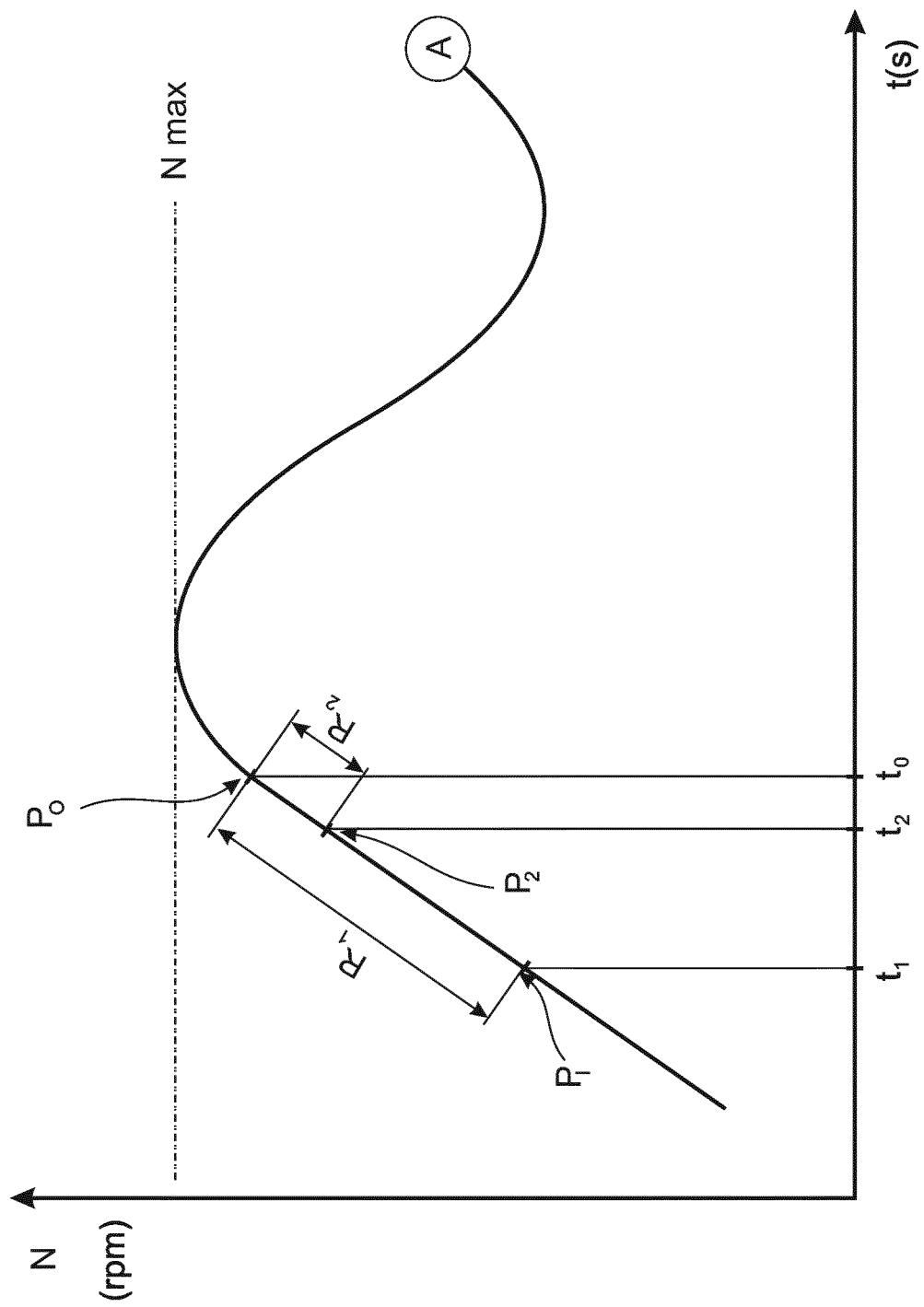
FIG. 2B shows a schematic diagram illustrating a gear shifting scenario for an upshift performed according to the invention.

FIG. 2B shows a schematic diagram illustrating a gear shifting scenario for an upshift performed according to the inventive method, corresponding to curve A in FIG. 2A. According to this example, an arrangement for controlling a gear shifting process according to the invention is implemented on a transmission, in order to significantly reduce the risk of a failed upshift.

In this example, a driver wishing to perform a manual request for an upshift during uphill travel can make the request in good time before the upshift is required. The request for an upshift can be made from the point $P_1$ at the time $t_1$. The arrangement will monitor a number of parameters and perform the upshift at an optimal point $P_0$ at the time $t_0$. Consequently, the driver can request an upshift well in advance of the optimal shift point, at any time within the relatively wide window $R_1$ between times $t_1$ and $t_0$ and leave the exact shift timing to the ECU of the gear shift arrangement.

This can be compared to a manual gear shift performed without the aid of the invention. In this case, the driver would be required to request a gear shift at point $P_2$ within the relatively narrow window $R_2$, extending from point $P_2$ to point $P_0$ between times $t_2$ and $t_0$. This clearly illustrates the pressure on the driver to make a manual request to command a direct upshift in order to avoid shocks and jerks in the transmission when using a prior art control arrangement.

Figure 3:
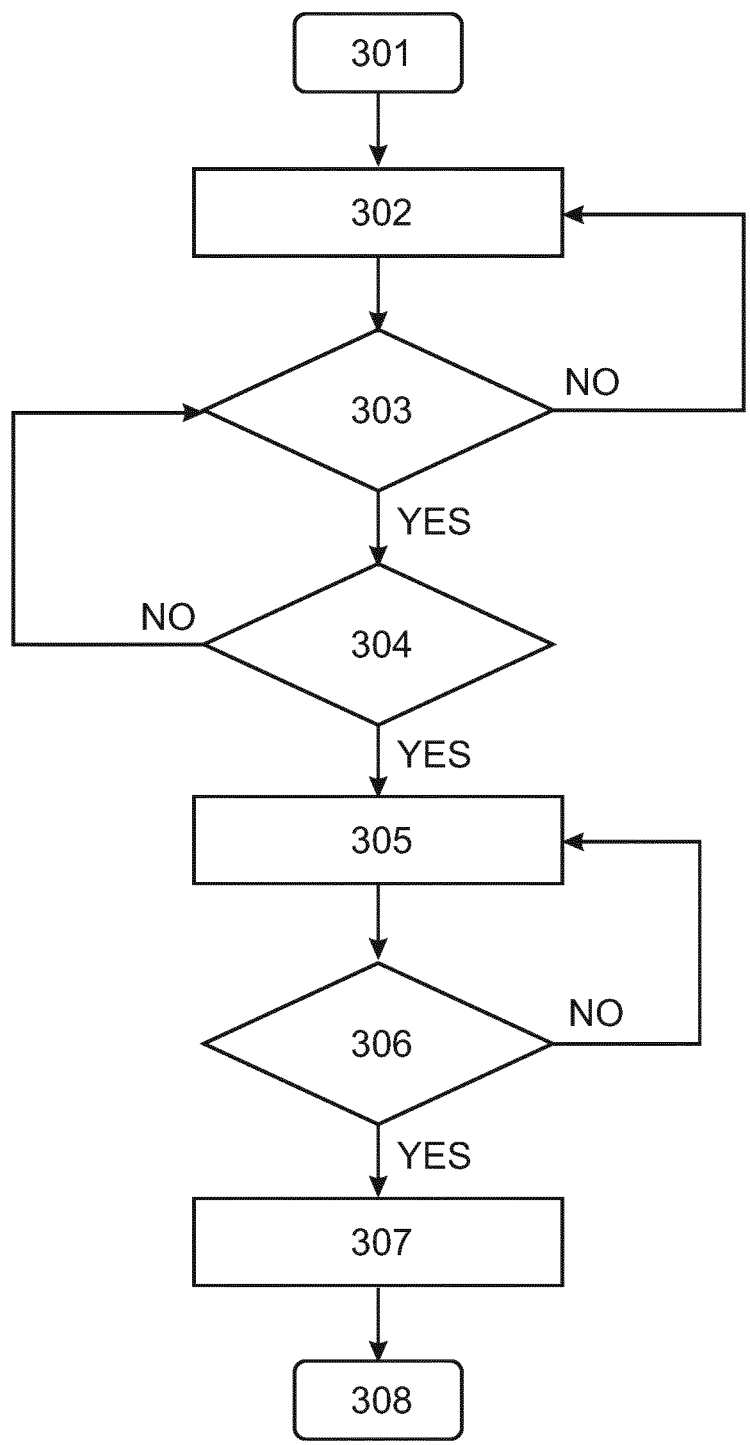
FIG. 3 shows a schematic flow chart for performing the method according to the invention.

FIG. 3 shows a schematic flow chart for performing the method according to the invention. According to the flow chart the process is initiated at step 301. The process can for instance be initiated at engine start, where after at least one parameter related to a vehicle operating condition is monitored at step 302 by an electronic control unit (ECU) as indicated in FIG. 1. The at least one parameter related to a vehicle operating condition is monitored continuously. At step 303 the ECU will check if the vehicle is travelling on a positive gradient, i.e. an uphill slope. In order to avoid unnecessary triggering of the subsequent steps, a predetermined threshold gradient can be selected. If the threshold gradient is not exceeded the process returns to the parameter monitoring step 302. However, if the threshold gradient is exceeded the process will proceed to step 304 and check if a manual request for an upshift has been made by the driver. If a request for an upshift has not been made the process returns to the gradient checking step 303. The loop between steps 303 and 304 is performed until a request for an upshift is registered, or until the gradient drops below the threshold gradient.

If it is registered that a manual upshift request has been made at step 304 then an upshift procedure is triggered. At the subsequent step 305 the ECU determines a desired shift point and a target engine speed based on a parameter comprising at least the current engine speed. The ECU will check that the engine speed is increasing as the vehicle travels uphill to determine that an upshift will be successful. The shift point and target engine speed are determined by the time required to perform an upshift from the current to the next gear and the current rate of increase of the engine speed. During the gear shift it is desirable that the engine speed increases from the target engine speed to a speed near or up to, but not over the maximum allowable engine speed. Further parameters that influence the vehicle trajectory up the hill are vehicle acceleration, changes to the gradient, fuel injection rate and available torque output. The accuracy of the method can be improved by considering additional monitored parameters. When a desired shift point and a target engine speed have been determined the process will proceed to step 306 to check if the target engine speed has been reached.

If the current engine speed has not reached the target engine speed at step 306 then the process returns to step 305 to confirm shift point and a target engine speed. In this way the initiation of a gear shift can be delayed until the target engine speed for the determined shift point is reached. During a delay, the ECU continuously monitors the parameters used. This allows the shift point and target engine speed to be recalculated at any time up to the currently determined shift point. For instance if a change in gradient is detected prior to the upshift the shift point may have to be brought forward or delayed, depending on the direction and rate of change of the gradient. The monitoring continues until the upshift is performed or aborted (not shown in FIG. 3). At step 305 it may be determined that an upshift is no longer possible as the monitored parameters are out of range, e.g. the gradient increases suddenly and causes a drop in engine speed. In such cases the process would need to return to step 302 and continue monitoring said parameters.

However, if the current engine speed has reached the target engine speed at step 306 then the process proceeds to step 307 to perform the requested upshift. After the upshift the process proceeds to step 308 and returns to step 302 to continue monitoring one or more parameters related to a vehicle operating condition. In this way the driver can drive the AMT in manual mode but still get support from the ECU and the arrangement controlling the AMT when shifting.

Although the example given above is related to an increased travel resistance in the form of an uphill gradient, the method is also applicable to an increase in travel resistance caused by the vehicle encountering a stretch of soft ground causing increased rolling resistance, and/or by an unexpected head wind causing increased air resistance.

The present invention also relates to a computer program, computer program product and a storage medium for a computer all to be used with a computer for executing the method as described in any one of the above examples.

Figure 4:
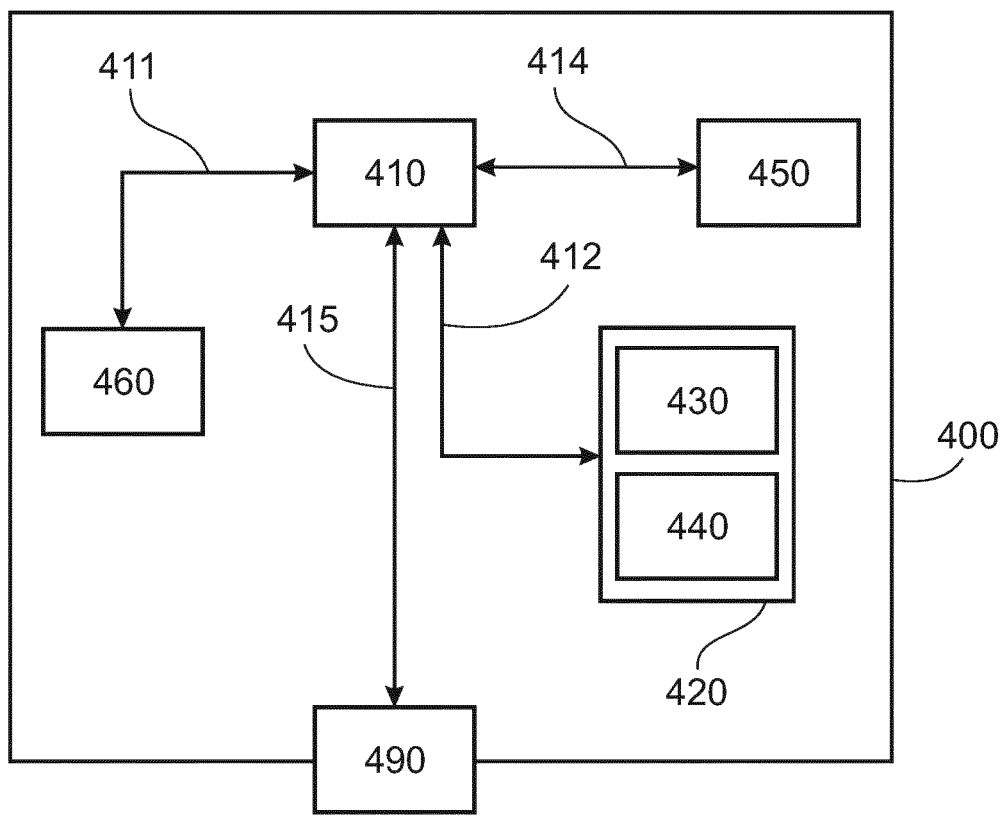
FIG. 4 shows the invention applied on a computer arrangement.

FIG. 4 shows an apparatus 400 according to one embodiment of the invention, comprising a non-volatile memory 420, a processor 410 and a read and write memory 460. The memory 420 has a first memory part 430, in which a computer program for controlling the apparatus 400 is stored. The computer program in the memory part 430 for controlling the apparatus 400 can be an operating system.

The apparatus 400 can be enclosed in, for example, a control unit, such as the control unit 45. The data-processing unit 410 can comprise, for example, a microcomputer. The memory 420 also has a second memory part 440, in which a program for controlling the target gear selection function according to the invention is stored. In an alternative embodiment, the program for controlling the transmission is stored in a separate non-volatile storage medium 450 for data, such as, for example, a CD or an exchangeable semiconductor memory. The program can be stored in an executable form or in a compressed state.

When it is stated below that the data-processing unit 410 runs a specific function, it should be clear that the data-processing unit 410 is running a specific part of the program stored in the memory 440 or a specific part of the program stored in the non-volatile storage medium 420.

The data-processing unit 410 is tailored for communication with the storage memory 420 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. A method to control a gearshift in a vehicle with a transmission comprising a stepped gearing, the transmission being arranged between an engine and at least one driven axle, wherein the engine and the transmission are controlled by an electronic control unit, the method comprising:
   monitoring at least one parameter related to a vehicle operating condition;
   registering that a manual upshift command is requested;
   determining a desired shift point and a target engine speed based on a parameter comprising at least current engine speed; and
   performing an upshift at a delayed point in time after the manual upshift command is requested and when the target engine speed is reached.

2. A method according to claim 1, whereby determining the shift point and the target engine speed based on a further parameter comprising at least vehicle acceleration.

3. A method according to claim 1, whereby determining the shift point and the target engine speed based on a further parameter comprising at least requested torque.

4. A method according to claim 3, whereby determining the shift point and the target engine speed if the requested torque is at least 80% of wide open throttle.

5. A method according to claim 1, whereby registering that an increased travel resistance is detected.

6. A method according to claim 5, whereby determining the shift point and the target engine speed based on a parameter comprising at least uphill gradient.

7. A method according to claim 5, whereby determining the shift point and the target engine speed based on a parameter comprising rolling resistance.

8. A method according to claim 6, whereby determining the shift point and the target engine speed based on vehicle load.

9. A method according to claim 1, whereby selecting the shift point and the target engine speed so that an engine speed exceeding a maximum engine speed is avoided during the upshift.

10. A method according to claim 1, whereby selecting the shift point so that the time required for performing an upshift is less than the time taken for the engine speed to increase from the target speed to a maximum engine speed during the upshift.

11. A method according to claim 1, whereby continuously monitoring the parameters and modifying the shift point and target engine speed until the upshift is performed or aborted.

12. A method according to claim 1, whereby calculating the shift point and target engine speed using the ECU, based on the at least one monitored parameter.

13. A method according to claim 1, whereby determining the shift point and target engine speed using at least one look-up table stored in the ECU, based on the at least one monitored parameter.

14. A control unit for controlling a gearshift in a vehicle with a transmission, the control unit being configured to perform the steps of the method according to claim 1.

15. A computer program comprising program code means for performing the method of claim 1 for controlling a gearshift in a vehicle with a transmission when the program is run on a computer.

16. A computer readable medium carrying a computer program comprising program code means for performing the steps of claim 1 for controlling a gearshift in a vehicle with a transmission when the program product is run on a computer.

17. An arrangement to control a gearshift in a vehicle with a transmission comprising a stepped gearing, the transmission being arranged between an engine and at least one driven axle, wherein the engine and the transmission are controlled by an electronic control unit, wherein
   the electronic control unit is arranged to monitor at least one parameter related to a vehicle operating condition;
   the electronic control unit is arranged to register that a manual upshift command is requested by the driver;
   the electronic control unit is arranged to determine a desired shift point and a target engine speed based on a parameter comprising at least current engine speed; and
   the electronic control unit is arranged to generate instructions to the transmission to perform an upshift at a delayed point in time after the manual upshift command is requested and when the target engine speed is reached.

18. An arrangement according to claim 17, wherein the electronic control unit is arranged to register that an increase in travel resistance is detected.

19. An arrangement according to claim 17, wherein the transmission is a semi-automatic transmission (SAT), an automatic transmission (AT) or an automated mechanical transmission (AMT).

20. A vehicle, wherein the vehicle is a commercial vehicle comprising an arrangement to control a gearshift according to claim 17.

* * * * *